3,063,961
MIXTURE OF (1) A BUTADIENE-NITRILE COPOLYMER, (2) A CARBOXYLIC BUTADIENE COPOLYMER AND (3) A CHLORINATED VINYLIDENE POLYMER AND PROCESS OF BLENDING SAME

Erich K. Frank, Westport, Conn., assignor to E. I. du Pont de Nemours and Company, Wilmington, Del., a corporation of Delaware
No Drawing. Filed Oct. 15, 1958, Ser. No. 767,282
7 Claims. (Cl. 260—45.5)

This invention relates to a chemical composition and more particularly to elastomeric mixtures of chlorinated vinylidene polymers and copolymers of butadiene-1,3 hydrocarbons and acrylic nitriles.

Because of their excellent resistance to oils, solvents and chemicals, rubbery copolymers of butadiene-1,3 hydrocarbons and acrylic nitriles have found wide use, for example, in the manufacture of carburator diaphragms, self-sealing fuel tanks, hoses, gaskets, printing rolls and the like. However, such copolymers are subject to attack by some chemicals and solvents, for example, aromatic solvents. Furthermore, such copolymers have notoriously poor ozone resistance, particularly when they are under stress. Also, medium and high acrylic nitrile copolymers, that is, those copolymers of butadiene-1,3 hydrocarbons and acrylic nitriles containing about 33% by weight or more of acrylic nitrile, have poor low-temperature properties; for example, when products fabricated with such copolymers are held at low temperatures, the products stiffen and crack.

When chlorinated vinylidene polymers are fluxed with the aforementioned copolymers of butadiene-1,3 hydrocarbons and acrylic nitriles, the resulting products have greatly improved ozone resistance and solvent resistance. "Fluxing" as used herein refers to milling or uniformly mixing or blending the chlorinated vinylidene polymers with the copolymers of butadiene-1,3 hydrocarbons and acrylic nitriles at a temperature above that at which the chlorinated vinylidene polymers become thermoplastic.

Heretofore, it has been very difficult to adequately flux chlorinated vinylidene polymers with low acrylic nitrile copolymers, that is, those copolymers of butadiene-1,3 hydrocarbons and acrylic nitriles containing about 25% by weight or less of acrylic nitrile. This problem has been particularly acute with copolymers containing about 20% by weight or less of acrylic nitrile. Procedures used to mix medium and high acrylic nitrile copolymers with chlorinated vinylidene polymers are not satisfactory for mixing low acrylic nitrile copolymers with chlorinated vinylidene polymers. When such procedures are used with low acrylic nitrile copolymers, the resulting products have properties similar to products made with compositions containing no chlorinated vinylidene polymer and, for example, have very poor resistance to ozone and aromatic solvents. Since only the low acrylic nitrile copolymers have excellent low-temperature properties, it has not heretofore been possible to prepare compositions having a combination of excellent low-temperature properties and ozone and solvent resistance.

I have discovered a method of combining copolymers of butadiene-1,3 hydrocarbons and acrylic nitriles with chlorinated vinylidene polymers to yield compositions which have a combination of excellent low-temperature properties and ozone and solvent resistance.

The compositions of this invention are uniformly fluxed mixtures comprising (a) 100 parts by weight of at least one copolymer of butadiene-1,3 hydrocarbon and up to about 25% by weight of acrylic nitrile, (b) about from 10 to 50, and preferably about from 20 to 30 parts by weight of at least one carboxylic-modified copolymer of at least about 50% by weight of butadiene-1,3 hydrocarbon, at least about 10% by weight of acrylic nitrile and about from 0.01 to 0.3 carboxyl equivalents of at least one acrylic acid per 100 parts by weight of carboxylic-modified copolymer, and (c) about from 10 to 75, and preferably 25 to 40 parts by weight per 100 parts by weight of (a) and (b) of chlorinated vinylidene polymer.

The low acrylic nitrile copolymers of butadiene-1,3 hydrocarbons and acrylic nitriles used in this invention are well known rubbery copolymers which are usually prepared by aqueous emulsion polymerization, for example, as disclosed in U.S. Patent 1,973,000. Examples of butadiene-1,3 hydrocarbons used in the preparation of these copolymers are butadiene-1,3 and the 5 to 9 carbon atom homologs thereof such as isoprene, 2,3-dimethyl butadiene-1,3, pentadiene-1,3 and hexadiene-1,3. Examples of acrylic nitriles are acrylonitrile, methacrylonitrile, ethacrylonitrile, alpha-butylacrylonitrile, alpha-phenyl acrylonitrile, alpha-chloroacrylonitrile and alpha-methoxymethyl acrylonitrile. Copolymers of butadiene-1,3 and acrylonitrile are preferred.

In order to have exceptionally good low-temperature properties, it is essential that the aforementioned low acrylic nitrile copolymers of butadiene-1,3 hydrocarbons and acrylic nitriles contain less than about 25% of acrylic nitrile. Although compounds containing a few percent of acrylic nitrile, for example, 5% by weight, can be used, low acrylic nitrile copolymers containing about from 15 to 20% by weight of acrylic nitrile have the best balance of properties, particularly solvent resistance and low temperature properties, and are preferred.

The second essential constituent of the compositions of this invention is at least one carboxylic-modified copolymer of at least about 50, and preferably about from 50 to 80% by weight of butadiene-1,3 hydrocarbon, at least about 10, and preferably about from 10 to 40% by weight of acrylic nitrile and about from 0.01 to 0.3, and preferably about from 0.05 to 0.15 carboxyl equivalent of at least one acrylic acid per 100 parts by weight of carboxylic-modified copolymer. As used herein the term "carboxyl equivalent" of an acrylic acid refers to that amount of the chemically combined acrylic acid which contains one equivalent weight, that is, 45 parts by weight, of free carboxyl (—COOH) groups. The amount of free carboxyl groups can be determined by titrating a solution of the carboxylic-modified copolymer with alcoholic potassium hydroxide to a phenolphthalein endpoint. These carboxylic-modified copolymers can be prepared by procedures similar to those used for preparing the low acrylic nitrile copolymers and from similar butadiene-1,3 hydrocarbons and acrylic nitriles. A preferred process for preparing the carboxylic-modified copolymers is described by H. P. Brown and C. G. Gibbs in "Carboxylic Elastomers," Rubber Chemistry and Technology, 28, p. 937 (1955). Examples of acrylic acids which are copolymerized with the butadiene-1,3 hydrocarbons and acrylic nitriles thereby introducing free carboxyl groups into the copolymer are acrylic acid, methacrylic acid, ethacrylic acid, alpha-chloroacrylic acid and the like. Methacrylic acid is preferred. These carboxylic-modified copolymers, which are rubbery and somewhat tacky, are essential in order to have adequate fluxing of the low acrylic nitrile copolymers described above and the chlorinated vinylidene polymers.

The third essential constituent of the compositions of this invention is at least one chlorinated vinylidene polymer, that is, a homopolymer or copolymer of vinyl chloride or vinylidene chloride. Such polymers are, for example, homopolymers of vinyl chloride, homopolymers of vinylidene chloride, copolymers of vinylidene chloride and vinyl chloride and copolymers of vinyl chloride (usually at least 85% by weight) and ethylenically unsaturated monomers copolymerizable therewith such as vinyl acetate, acrylonitrile, styrene and maleic, fumaric and acrylic acid esters. Copolymers of vinyl chloride and vinylidene chloride are particularly preferred because of the ease with which they can be fluxed with the low acrylic nitrile copolymers.

Conventional additives such as pigments and fillers, antioxidants, release agents, curing agents and accelerators for the low acrylic nitrile copolymers and plasticizers and the thermal stabilizers for the chlorinated vinyl polymers can, and preferably are added to the compositions of this invention in conventional amounts. Any of the conventional compatible and inert or reinforcing rubber pigments and fillers such as carbon black, calcium carbonate, iron oxide, clay, hydrated silica, diatomaceous earth and talc can be used. Usually about from 25 to 100 parts by weight per 100 parts by weight of low acrylic nitrile copolymer and carboxylic-modified copolymer are used. Examples of antioxidants are polymerized trimethyl dihydroquinoline, phenyl beta-naphthylamine, phenyl alphanaphthylamine, hydroquinone monobutyl ether and paraffin hydrocarbons. Conventional curing agents such as zinc oxide, magnesium oxide and sulfur, accelerators such as dicumyl peroxide, tetramethyl thiuram monosulfide, di-2-benzothiazyl disulfide and additives such as fatty acids like stearic acid and oleic acid can also be used. Examples of plasticizers are di(2-ethyl hexyl)phthalate, di(2-ethyl hexyl)-azelate, dibutyl phthalate, tributoxy ethyl phosphate, dioctyl adipate, dibutyl "Cellosolve" sebacate, epoxidized soya bean oil and mixtures thereof. The amount of plasticizer used varies with the flexibility desired, increases with the amount of chlorinated vinylidene polymer used and decreases with the amount of pigment and fillers employed. Thermal stabilizer for the chlorinated vinyl polymers are, for example, barium and cadmium salts of long-chain fatty acids such as lauric, capriric and palmitic acids and alkaline earth ricinoleates.

The compositions of this invention are prepared by first blending the carboxylic-modified copolymer with the low acrylic nitrile copolymer on a rubber mill, Banbury mixer, or other conventional rubber milling device. The low acrylic nitrile copolymer is usually premilled, then the carboxylic-modified copolymer is added thereto. Preferably, pigments, fillers, antioxidants and at least part of any plasticizer which is used are milled into the compositions at this time. Finally, the chlorinated vinylidene polymer, together with the remainder of any plasticizer and thermal stabilizer which are used, are milled with the mixture. During this latter step, the mill is held at a temperature sufficient to flux the chlorinated vinylidene polymer until the chlorinated vinyl polymer is thoroughly mixed with the other ingredients. The milling temperature depends largely upon the temperature at which the chlorinated vinyl polymer softens. Usually the compositions are fluxed at a temperature above about 300° F. and preferably 310 to 350° F. for about from 3 to 10 minutes. Finally the completely formulated composition is cooled, for example, by transferring it to a cold mill or by dipping it in water.

As stated hereinbefore, it has not heretofore been possible to adequately flux low acrylic nitrile copolymers with chlorinated vinyl polymers. Furthermore, it has usually only been possible to adequately flux medium and high acrylic nitrile copolymers with chlorinated vinylidene polymers by compounding the copolymers and the chlorinated vinylidene polymers separately with suitable plasticizers, pigments, fillers, curing agents, accelerators and the like, then mixing the compounded stocks. By the process of this invention, it is now possible to flux chlorinated vinylidene polymers with low acrylic nitrile copolymers in a continuous process requiring only one mill.

Before the compositions of this invention are fabricated, the curing agents and accelerators are milled therewith.

The compositions of this invention can be sheeted into unsupported films, calendered onto fabrics of all types and other materials which are commonly coated with rubber-like coatings, or applied as solution coatings by conventional methods. Articles comprising a fabric substrate coated on one or both sides with the compositions of this invention are particularly useful as diaphragm materials. Other uses for the compositions are in tank linings, particularly fuel-tank linings, in hoses, in wire coverings and in tarpaulins. The fabricated compositions are vulcanized usually at a temperature of 250 to 350° F. for about from 5 minutes to 5 hours, depending upon the vulcanizing temperature and the curing agents and accelerators used. Also, the compositions can be molded and vulcanized simultaneously with heat and pressure or molded, then vulcanized.

The compositions of this invention are particularly useful for products, for example, in modern aircraft, in which a combination of ozone resistance, extreme low-temperature flexibility and resistance to solvents, including aromatic solvents, are essential prerequisites. Products prepared from the compositions of this invention retain their ozone resistance permanently and unlike articles containing or coated with waxes and the like, retain their ozone resistance throughout use even when they are stressed.

The following examples are intended to illustrate the invention and not to limit it in any way. Parts and percentages are by weight unless otherwise specified.

*Example 1*

Eighty parts of a low acrylic nitrile copolymer of butadiene-1,3 and acrylonitrile were premilled on a standard rubber mill and then the following materials were milled therewith to yield a mixture having the following composition:

| | Parts |
|---|---|
| Low acrylic nitrile copolymer | 80.0 |
| Carboxylic-modified copolymer | 20.0 |
| Pigment and filler: | |
| $Fe_2O_3$ | 14.0 |
| Calcium carbonate | 47.0 |
| Dibutyl "Cellosolve" sebacate-plasticizer | 40.0 |
| Polymerized trimethyl dihydroquinoline antioxidant | 2.0 |
| Stearic acid | 1.0 |

The low acrylic nitrile copolymer was "Hycar" 1014, which is a rubbery copolymer of about 82% of butadiene-1,3 and about 18% of acrylonitrile. The carboxylic-modified copolymer was a rubbery and somewhat tacky copolymer containing about 0.1 carboxyl equivalent of methacrylic acid prepared by the aqueous copolymerization of a mixture of monomers consisting of 55% of butadiene-1,3, 35% of acrylonitrile and 10% of methacrylic acid.

Next, 40 parts of a copolymer of vinyl chloride and vinylidene chloride ("Geon" 202), 1.2 parts of thermal stabilizer consisting of a mixture of barium and cadmium salts of long-chain fatty acids, principally lauric acid, 18 more parts of dibutyl "Cellosolve" sebacate and 2.0 parts of epoxidized soya bean oil plasticizer were added to the mill and fluxed at a temperature of 320° F. for about 5 minutes. Finally, curatives consisting of 1.5 parts of sulfur, 0.4 part of tetramethyl thiuram monosulfide, and 5 parts of zinc oxide were milled with the mixture to yield a completed, uniformly fluxed composition of this invention.

A 75-mil thick sheet of the composition described above was prepared and vulcanized at about 307° F. for 30 minutes in accordance with A.S.T.M. designation D 15-55T. The resulting product had a Shore A hardness of 40, a tensile strength of 500 pounds per square inch and an elongation at break of 406%. A dumbbell sample cut from the sheet and stretched 25% showed no deterioration when subjected to an atmosphere containing 124 parts of ozone per million parts of air for 47 hours. When the procedure described above was repeated except that the carboxylic-modified copolymer was omitted, a dumbbell sample of the resulting product stretched 25% broke in less than an hour. When sheets of the composition of this example containing carboxylic-modified copolymer were immersed in various aliphatic and aromatic solvents for 24 hours and at room temperature, they showed very good solvent resistance.

The composition of this invention described above was calendered on both sides of a prime-coated parachute nylon fabric to yield a coated diaphragm material having a thickness of about 18 mils. The coated fabric was then placed in a mold and molded and vulcanized simultaneously at about 310° F. for 7 minutes under a pressure of about 500 pounds per square inch. The resulting molded diaphragm remained flexible at −65° F. and had a cold-crack temperature of less than −90° F.

If a low acrylic nitrile copolymer polymerized from about 80% by weight of butadiene-1,3 and 20% by weight of methacrylonitrile is substituted for the low acrylic nitrile copolymer used in the composition described above, products having properties similar to those described are obtained. Similarly, if a carboxylic-modified copolymer polymerized from 67% of 2,3-dimethyl butadiene-1,3, 24.4% of acrylonitrile and 8.6% of methacrylic acid and having a carboxyl equivalent of about 0.09 is substituted for the carboxylic-modified copolymer described above, substantially similar results are obtained.

*Examples 2 and 3*

Two uniformly fluxed compositions of this invention were prepared by the procedure and from the materials shown in Example 1 except that 33 and 25 parts, respectively, of the copolymer of vinyl chloride and vinylidene chloride were substituted for the 40 parts of chlorinated vinylidene polymer used in that example. The resulting compositions were sheeted to a thickness of about 75 mils. After vulcanization, a dumbbell sample of each composition was cut from each sheet, stretched 25% and subjected to an atmosphere containing 39 parts of ozone per million parts of air. Neither sample showed any deterioration after 8 hours.

*Example 4*

A uniformly fluxed mixture was prepared from the following materials by the general procedure shown in Example 1:

|  | Parts |
|---|---|
| Low-acrylic nitrile copolymer | 80.0 |
| Carboxylic-modified copolymer (same as Example 1) | 20.0 |
| Homopolymer of vinyl chloride ("Marvinol" VR31) | 40.0 |
| Pigment and filler: | |
|   Semi-reinforcing furnace black | 56.0 |
|   Calcium carbonate | 20.0 |
| Plasticizer: | |
|   Dibutoxy ethoxyethyl adipate | 18.0 |
|   Dibutyl "Cellosolve" sebacate | 40.0 |
|   Epoxidized soya bean oil | 2.0 |
| Thermal stabilizer (same as Example 1) | 1.2 |
| Phenyl beta-naphthylamine-antioxidant | 1.0 |
| Curing agent and accelerator: | |
|   Zinc oxide | 5.0 |
|   Sulfur | 1.5 |
|   Di-2-benzothiazyl disulfide | 1.5 |
|   Stearic acid | 1.0 |

The low acrylic nitrile copolymer ("Paracril" 18–80) contained about 82% of butadiene-1,3 and 18% of acrylonitrile.

A vulcanized, 75-mil thick sheet of the uniformly fluxed mixture of this example had a Shore A hardness of 52, a tensile strength of 920 pounds per square inch and an elongation at break of 400%. Specimens cut from the sheet, elongated 20% and tested in accordance with A.S.T.M. designation D-1149–55T showed no deterioration after exposure to an atmosphere containing 1,000 parts of ozone per 100 million parts of air for 18 hours.

If, instead of the carboxylic-modified copolymer shown in this example, an equal weight of a similar carboxylic-modified copolymer containing about 0.1 carboxyl equivalent of acrylic acid is used, substantially similar results are obtained.

I claim:
1. A uniformly fluxed mixture comprising
   (a) 100 parts by weight of a copolymer of a monomer from the group consisting of butadiene-1,3 and homologs thereof containing 5 to 9 carbon atoms, and up to 25 parts by weight of a monomer from the group consisting of acrylonitrile, methacrylonitrile, ethacrylonitrile, alpha-butylacrylonitrile, alpha-phenylacrylonitrile, alpha-chloroacrylonitrile, and alpha-methoxymethylacrylonitrile;
   (b) about from 10 to 50 parts by weight of a carboxylic-modified copolymer of at least about 50% by weight of a monomer from the group consisting of butadiene-1,3 and homologs thereof containing 5 to 9 carbon atoms, at least about 10% by weight of a monomer from the group consisting of acrylonitrile, methacrylonitrile, ethacrylonitrile, alpha-butylacrylonitrile, alpha-phenylacrylonitrile, alpha-chloroacrylonitrile, and alpha-methoxymethylacrylonitrile, and about from 0.01 to 0.3 carboxyl equivalent of an acrylic acid per 100 parts by weight of carboxylic-modified copolymer; and
   (c) about from 10 to 75 parts by weight, per 100 parts by weight of (a) and (b), of chlorinated vinylidene polymer selected from the class consisting of polyvinyl chloride, polyvinylidene chloride, a copolymer of vinyl chloride with an ethylenically unsaturated monomer copolymerizable therewith, and a copolymer of vinylidene chloride with an ethylenically unsaturated monomer copolymerizable therewith.

2. The mixture of claim 1 in which the amount of monomer other than butadiene-1,3 and homologs thereof in (a) is from about 15 parts to 20 parts by weight, and the carboxyl equivalent in (b) is from about 0.05 to 0.15.

3. The mixture of claim 2 containing about 20 to 30 parts by weight of the carboxylic-modified copolymer of (b) and about 25 to 40 parts by weight of chlorinated vinylidene polymer of (c) per 100 parts by weight of (a) and (b).

4. The mixture of claim 3 wherein the chlorinated vinylidene polymer is a homopolymer of vinyl chloride.

5. The mixture of claim 3 wherein the chlorinated vinylidene polymer is a copolymer of vinyl chloride and vinylidene dichloride.

6. A process which comprises blending
   (a) 100 parts by weight of a copolymer of a monomer from the group consisting of butadiene-1,3 and homologs thereof containing 5 to 9 carbon atoms, and up to 25 parts by weight of a monomer from the group consisting of acrylonitrile, methacrylonitrile, ethacrylonitrile, alpha-butylacrylonitrile, alpha-phenylacrylonitrile, alpha-chloroacrylonitrile, and alpha-methoxymethylacrylonitrile; with
   (b) about from 10 to 50 parts by weight of a carboxylic-modified copolymer of at least about 50% by weight of a monomer from the group consisting of butadiene-1,3 and homologs thereof containing 5 to 9 carbons atoms, at least about 10% by weight of a monomer from the group consisting of acrylonitrile, methacrylonitrile, ethacrylonitrile, alpha-butylacrylonitrile, alphaphenylacrylonitrile, alpha - chloroacrylonitrile, and alpha-methoxymethylacrylonitrile, and about from 0.01 to 0.3 carboxyl equivalent of an acrylic acid per 100 parts by weight of carboxylic-modified copolymer; incorporating therein
   (c) about from 10 to 75 parts by weight, per 100 parts by weight of (a) and (b), of chlorinated vinylidene polymer selected from the class consisting of polyvinyl chloride, polyvinylidene chloride, a copolymer of vinyl chloride with an ethylenically unsaturated monomer copolymerizable therewith, and a copolymer of vinylidene chloride with an ethylenically unsaturated monomer copolymerizable therewith, and uniformly fluxing the resulting composition at a temperature above the softening point of said chlorinated vinylidene polymer.

7. The process of claim 6 wherein said composition is fluxed at a temperature of about 310° F. to 350° F. for about 3 minutes to 10 minutes.

References Cited in the file of this patent
UNITED STATES PATENTS

| | | |
|---|---|---|
| 2,614,093 | Wheelock | Oct. 14, 1952 |
| 2,808,387 | Parks et al. | Oct. 1, 1957 |
| 2,872,366 | Kiernan et al. | Feb. 3, 1959 |